United States Patent
Roychowdhury (10) Patent No.: US 12,265,529 B1
(45) Date of Patent: Apr. 1, 2025

(54) CONTEXT-DEPENDENT QUERY GENERATION

(71) Applicant: Capital One Services, LLC, McLean, VA (US)

(72) Inventor: Arjun Roychowdhury, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 1 day.

(21) Appl. No.: 18/477,227

(22) Filed: Sep. 28, 2023

(51) Int. Cl.
*G06F 16/00* (2019.01)
*G06F 16/21* (2019.01)
*G06F 16/242* (2019.01)
*G06F 16/28* (2019.01)

(52) U.S. Cl.
CPC ........ *G06F 16/2433* (2019.01); *G06F 16/212* (2019.01); *G06F 16/285* (2019.01)

(58) Field of Classification Search
None
See application file for complete search history.

(56) References Cited

U.S. PATENT DOCUMENTS

| | | | | |
|---|---|---|---|---|
| 7,904,319 | B1* | 3/2011 | Whear | G06Q 40/08 705/4 |
| 10,320,633 | B1* | 6/2019 | Wong | H04L 67/535 |
| 11,501,112 | B1* | 11/2022 | Oliner | G06F 16/90335 |
| 11,881,315 | B1* | 1/2024 | Soon-Shiong | G16H 50/30 |
| 2006/0224593 | A1* | 10/2006 | Benton | G06F 16/951 |
| 2019/0205372 | A1* | 7/2019 | Li | G06F 40/232 |
| 2020/0159737 | A1* | 5/2020 | Chan | G06F 16/285 |
| 2021/0133688 | A1* | 5/2021 | Park | H04L 51/046 |
| 2022/0245704 | A1* | 8/2022 | Xie | G06Q 30/0627 |
| 2023/0098165 | A1* | 3/2023 | Shi | G06F 11/0709 709/223 |
| 2023/0132033 | A1* | 4/2023 | Gupta | G06F 11/366 717/120 |
| 2023/0169360 | A1* | 6/2023 | Busany | G06F 16/212 706/46 |
| 2023/0247042 | A1* | 8/2023 | Luttwak | H04L 63/1441 726/25 |
| 2023/0252049 | A1* | 8/2023 | Na | G06F 16/24573 707/737 |
| 2023/0315843 | A1* | 10/2023 | Yona | G06F 21/54 726/22 |
| 2024/0111959 | A1* | 4/2024 | Gupta | G06F 40/30 |

* cited by examiner

*Primary Examiner* — Hasanul Mobin (74) *Attorney, Agent, or Firm* — Foley & Lardner LLP (57) ABSTRACT

A method and related system for generating and presenting queries is disclosed. The method includes selecting a first context based on a set of inputs including a first query and determining a match between the first context and a stored context associated with a schema. The method further includes generating a second query based on the set of inputs with a first language model in response to the determination of the match and identifying an indicated portion of the second query by providing, as a second input, the second query to a second language model. The method also includes generating data, the data including an issue indicator of the second query based on the indicated portion; and sending the data to the client device.

20 Claims, 3 Drawing Sheets

CONTEXT-DEPENDENT QUERY GENERATION

SUMMARY

In many cases, queries are used to retrieve any useful information from databases, knowledge graphs, or other types of data structures. However, such queries may be susceptible to changes in a data structure between different versions, different environments, or different applications. For example, a query that is usable to retrieve information in a development environment may become unusable as a result of being transferred into a testing environment. Modifying these queries for new environments or new data structures may be time consuming, laborious, or even impractical to implement. Furthermore, upon implementation of such new queries suited for a new environment or application, a computing system may end up displaying an error message or a warning due to one or more undetected incompatibilities or inefficiencies in the query.

Some embodiments may generate a query adapted to a custom schema for database-stored data. Some embodiments may generate such a query using one or more large language models, where the first language model may be configured to generate a query and where a second language model may be configured to check the query for issues. Some embodiments may train or otherwise configure the query-generating language model with a schema for data in a target database. Similarly, some embodiments may train or otherwise configure the issue-detecting language model with the schema and a set of erroneous model queries or other queries associated with issues representing errors, inefficiencies, or other types of issues. These different language models may be trained using different datasets and may even contradict each other with respect to what is recommended due to their separate roles in the process of generating a viable query. Furthermore, by separating the language models into a generative model and an issue-detecting language model, different issues associated with different environments may be accounted for when generating queries and detecting issues for the generated queries.

Some embodiments may obtain a set of user-provided inputs, such as a user-provided query written in a query language or a query written in natural language form. Some embodiments may determine candidate context information representing a source computing environment, a target computing environment, or other information usable to select or modify a language model. Some embodiments may detect a match between the candidate context and a stored context associated with the schema and then select a language model associated with the schema or a target database associated with the schema. In response to the detected match, some embodiments may then generate a query with the query-generated language model and then identify portions of the generated query associated with one or more issues using the issue-detecting language model. Some embodiments may then generate an issue indicator associated with the identified portions, store these issue indicators in memory, or present them for display to a user concurrently with a generated query. Some embodiments may then permit a user to further modify the generated query or directly use the generated query to retrieve values from a database.

Various other aspects, features, and advantages will be apparent through the detailed description of this disclosure and the drawings attached hereto. It is also to be understood that both the foregoing general description and the following detailed description are examples and not restrictive of the scope of the invention.

BRIEF DESCRIPTION OF THE DRAWINGS

Detailed descriptions of implementations of the present technology will be described and explained through the use of the accompanying drawings.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
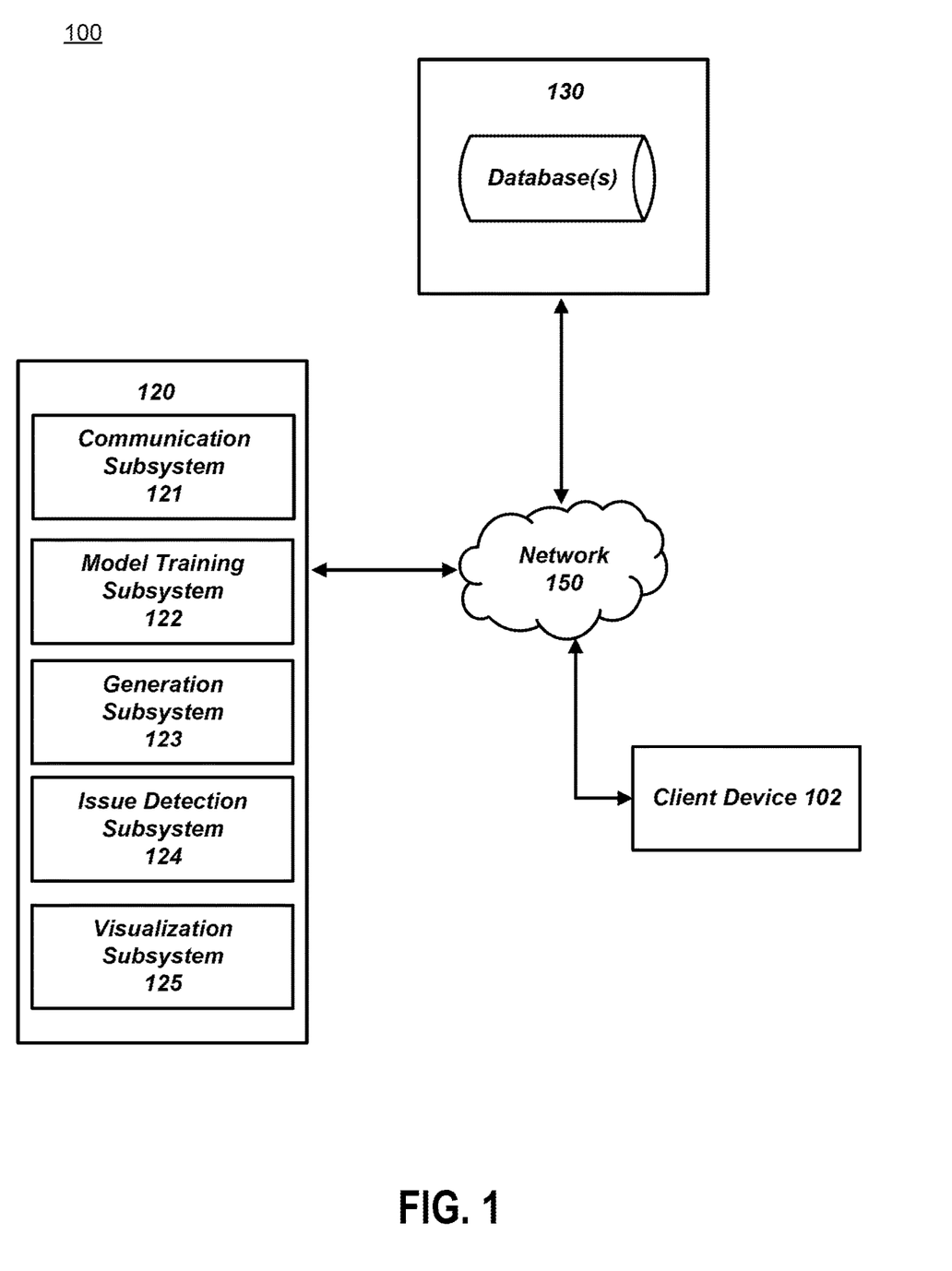
FIG. 1 illustrates an example system to use language models for generating queries, in accordance with some embodiments.

FIG. 1 illustrates an example system to use language models for generating queries, in accordance with some embodiments. A system 100 includes a client device 102. While shown as a laptop computer, it should be noted that the client device 102 may include other types of computing devices such as a desktop computer, a wearable headset, a smartwatch, another type of mobile computing device, etc. In some embodiments, the client device 102 may communicate with various other computing devices via a network 150, where the network 150 may include the internet, a local area network, a peer-to-peer network, etc. The client device 102 may send and receive messages through the network 150 to communicate with a set of servers 120, where the set of servers 120 may include a set of non-transitory storage media storing program instructions to perform one or more operations of subsystems 121-125. By performing such operations using one or more components shown in the system 100, some embodiments may generate queries adapted to different types of schema of a data structure.

While one or more operations are described herein as being performed by particular components of the system 100, those operations may be performed by other components of the system 100 in some embodiments. For example, one or more operations described in this disclosure as being performed by the set of servers 120 may instead be performed by the client device 102. Furthermore, some embodiments may communicate with an application programming interface (API) of a third-party service via the network 150 to perform various operations disclosed herein, such as configuring language models, determining matches between contexts, or performing other operations described in this disclosure. For example, some embodiments may use an API to train or otherwise configure a set of language models.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure. For example, the set of databases 130 may store training data to train a language model, model parameters used to configure a language model, generated queries, issue indicators associated with portions of a query, etc.

In some embodiments, a communication subsystem 121 may retrieve information such as model parameters of a language model, obtain queries from the client device 102 via the network 150, or obtain other values used or described in this disclosure. Furthermore, the communication subsystem 121 may send data to other computing devices, APIs, or client computing devices such as the client device 102. For example, as described elsewhere in this disclosure, some embodiments may generate data to be sent to the client device 102, where this data may be sent using the communication subsystem 121.

In some embodiments, a model training subsystem 122 may be used to train or otherwise configure a language model, where the language model may be stored or executed using one or more processors of the set of servers 120. Alternatively, or additionally, the model training subsystem 122 may train or otherwise configure a language model or a layer of the language model by providing commands, training data, or other data to an API. A cloud computing platform or other set of remote computing devices may receive such data via the API and execute any commands of the communicated data, train a language model based on training data of the communicated data, or otherwise update or configure a language model based on the communicated data.

In some embodiments, the model training subsystem 122 may perform training operations to update the model parameters of a language model. For example, the model training subsystem 122 may train a first language model to generate a query by using a training set that includes a set of queries or encodings representing queries. As described in this disclosure, a language model may include one or more neural networks that are characterized by relationships between neural units of the neural network and parameters describing these neural units and relationships between these neural units (e.g., weights, biases, memory parameters, etc.). Various types of neural networks may be used, such as convolutional neural networks, recurrent neural networks, transformers, etc. The language model may also include sub-model components to perform preprocessing or post-processing operations.

In some embodiments, the model training subsystem 122 may include a preprocessing subsystem to convert an input query into a model-compatible input. Some embodiments may augment an input query with information to increase the likelihood of generating an accurate output query. For example, some embodiments may determine that a specific data field is associated with a data table and augment or otherwise associate an initial input query with the identifier of the data table to increase an accuracy of the query.

Some embodiments may also receive other types of information as a set of user-provided inputs, such as an indication of a source computing environment, a target computing environment, data sources to be used, etc. Some embodiments may use this information to select different language models or configure different language models. For example, some embodiments may determine that a user-provided set of inputs includes a text string, where the text string is source code for a user-provided query. Some embodiments may then determine one or more context values based on the set of inputs, where a context value may be one or more values of the set of inputs themselves or may be values derived from the set of inputs. For example, some embodiments may determine, as a context value, a language type for a text string, where the language type may include categories such as "natural language," "Python," "GraphQL," etc. Some embodiments may then use these other types of user-provided input to select a language model, configure a language model, or otherwise determine parameters for a language model used to generate a query.

In some embodiments, a query generation subsystem 123 may generate a query based on a set of user inputs, such as user inputs communicated via the communication subsystem 121. Some embodiments may select a specific language model from a plurality of language models based on context information, such as a language or environment of an initial query provided by a user or a target database or target environment provided by the user. For example, some embodiments may determine that a user-provided query is a GraphQL query and that a target database is "DB2." Some embodiments may then determine which combination of context parameters matches with a stored set of context parameters, where the stored set of context parameters is associated with a language model or a set of parameters of a liquid model. For example, some embodiments may detect a match between a provided set of context values and a stored set of context values mapped to a first language model. Some embodiments may then select this first language model in response to the detected match. Alternatively, or additionally, some embodiments may determine a language model for query generation by updating a version of a language model with a set of parameters of the language model that is associated with the stored context values. For example, some embodiments may detect a match between a provided set of classic values in a stored set of context values mapped to a set of language model parameters. Some embodiments may then update the parameters of a language model with the set of language model parameters and use the updated language model to generate a new query.

Detection subsystem 124 may provide a generated query to a second language model, where the second language model may be configured and trained to detect one or more issues. In some embodiments, a detected issue may include a string of a source code or template of the source code that is known to result in a query error. For example, some embodiments may obtain a machine-generated query that includes a reference to a first database in a first environment. Some embodiments may provide this machine-generated query to an issue-detecting language model as an input and receive, from the issue-detecting language model, an output issue indicator that indicates a portion of the machine-generated query. The issue indicator may include or be associated with an identifier of an issue represented by a text descriptor, where the text descriptor may disclose that the first database is not present in the first environment.

In some embodiments, the query generation subsystem 123 may be provided with an output of the detection subsystem 124 or data derived from an output of the detection subsystem 124. For example, the query generation subsystem 123 may be provided with a portion of a query indicated by the detection subsystem 124. The query generation subsystem 123 may then provide an alternate string for the query portion or an alternate template for a template of the query portion. For example, some embodiments may receive an issue indicator associated with a first template represented by a regular expression. Some embodiments may receive the regular expression pattern and generate a second regular expression pattern representing an alternative template for the portion of the query. Some embodiments may then populate fields of the template associated with a schema of a target database or an environment. For example, some embodiments may provide a query template represented by the regular expression "\([A-Za-z0-9]+:.* [A-Za-z]+\)\{[^}]*}." Some embodiments may then replace this with the regular expression "[A-Za-z]+:[A-Za-z]+\([A-Za-z0-9]+:[A-Za-z]+1)\{[^}]*\]+[A-Za-z0-9]+:" and replace one or more portions of the regular expression with previously used database names, field names stored in or derived from a schema, or field values.

In some embodiments, a visualization subsystem 125 may generate data to be transmitted to a device capable of visualizing the output of a language model, such as the client device 102. The data may include information such as the text of a query to be displayed, an issue indicator that indicates a portion of the text, additional data about the issue identified by the issue indicator, etc. In some embodiments, the data sent to the client device 102 may cause updates to one or more portions of a user interface (UI) of the client device 102. For example, the UI of the client device 102 may present a text form of a query and a highlighted portion representing a portion of the query associated with an indicated issue (e.g., "fatal error" or "deprecated database").

Figure 2:
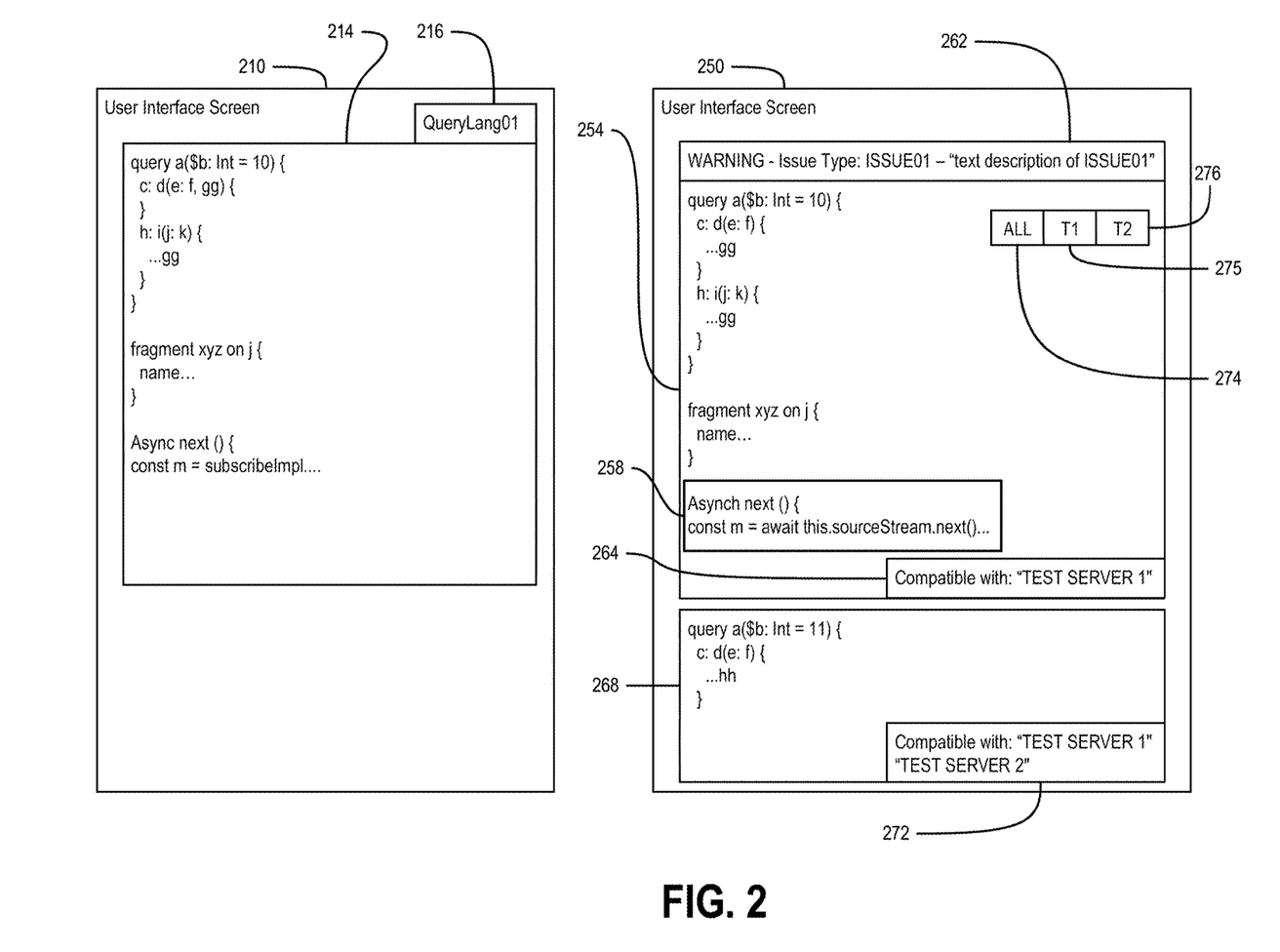
FIG. 2 illustrates an example set of user interfaces showing a set of inputs and an output of a query-generating language model, in accordance with some embodiments.

FIG. 2 illustrates an example set of user interfaces showing a set of inputs and an output of a query-generating language model, in accordance with some embodiments. A first UI screen 210 displays a user-provided query 214 and an additional user-provided input 216 representing an input language. The first UI screen 210 may be presented on a client device, such as a desktop computer, laptop computer, tablet, smartphone, or other mobile computing device. In some embodiments, a set of computing devices acting as a server may obtain a set of user inputs that includes the user-provided query 214 and the additional user-provided input 216 from the client device.

After being provided with the set of user inputs, a server or other set of computing devices may perform operations described in this disclosure to send data back to the client device and cause the client device to display a second UI screen 250. The second UI screen 250 includes a first generated query 254, an issue indicator 258, and an issue descriptor 262. While the issue indicator 258 is shown as a border surrounding a portion of the first generated query 254, an issue indicator may be shown in other ways. For example, some embodiments may visually represent an issue indicator as a highlighted region. Furthermore, the second UI screen 250 includes a first box 264 that presents an identifier of a first set of compatible environments for a query, where the first box 264 indicates that the first generated query 254 is predicted to be invokable in "TEST SERVER 1."

The second UI screen 250 also displays UE elements 274-276, where UI elements are shown as buttons representing issue categories associated with different issues. An interaction with each UI element of the set of UI elements 274-276 may cause a different set of issue indicators to be presented. For example, an interaction with the first UI element 274 may cause all issue indicators to be presented concurrently with the first generated query 254, an interaction with the second UI element 275 may cause only issue indicators associated with the category label "T1" to be presented concurrently with the first generated query 254, and an interaction with the third UI element 276 may cause only issue indicators associated with the category label "T2" to be presented concurrently with the first generated query 254.

Some embodiments may concurrently display multiple output queries that are generated by a language model. As shown in the second UI screen 250, a second generated query 268 is displayed concurrently with the first generated query 254. As described elsewhere in this disclosure, some embodiments may generate multiple output queries based on a set of user inputs. Some embodiments may filter these multiple queries using an issue-detecting language model to select a subset (e.g., only one generated query, two generated queries, etc.) to send to a client device for presentation. Some embodiments may present all generated queries as alternative queries that may be presented by a client device. It should be understood that the criteria can be used to filter a set of generated queries to a subset of generated queries such that the subset of generated queries to be sent to a client device may be greater than one generated query. Furthermore, the second UI screen 250 includes a second box 272 that presents identifiers of a second set of compatible environments for a query, where the second box 272 indicates that the second generated query 268 is predicted to be invokable in "TEST SERVER 1" and in "TEST SERVER 2."

Figure 3:
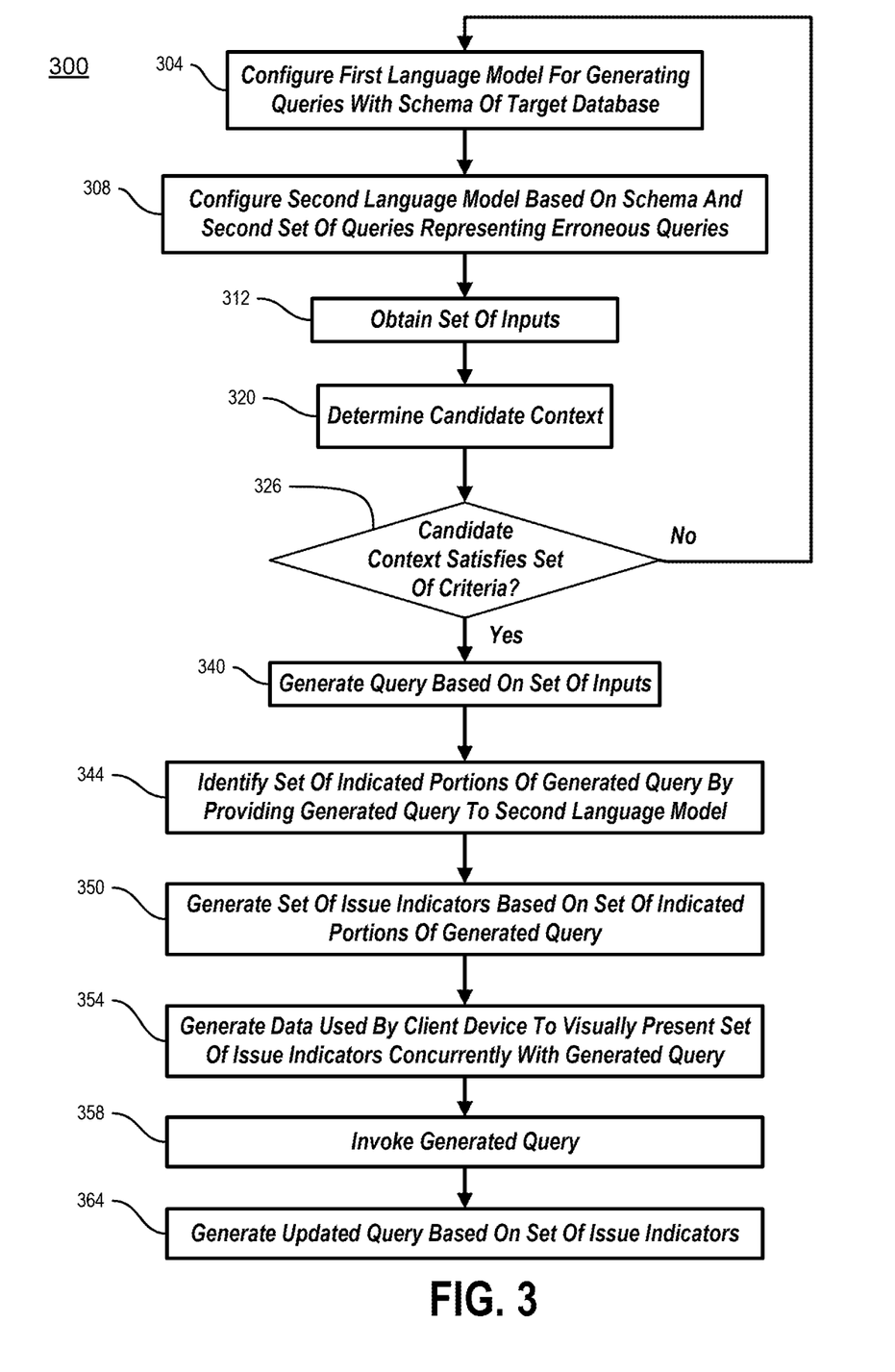
FIG. 3 is a flowchart of a process for generating a query adapted to a custom schema for database-stored data, in accordance with one or more embodiments.

FIG. 3 is a flowchart of a process for generating a query adapted to a custom schema for database-stored data, in accordance with one or more embodiments. Some embodiments may configure a first language model for generating queries with a schema of a target database, and a first set of queries, as indicated by block 304. The first language model may be a query-generating first language model designed to output a query in a target query language. Some embodiments may preprocess the input or output for a language model based on a schema for a target database. For example, some embodiments may preprocess the input or output of a language model to indicate a type of field in place of a specific field name, and the type of field may be stored in metadata associated with a database or other data structure. Some embodiments may then train a query-generating language model based on a stored set of training queries. For example, some embodiments may use training data that includes a set of model queries, where the set of model queries may be retrieved from a database of previously used queries.

In some embodiments, configuring a language model may include updating a vector dataset associated with the training of the language model. For example, some embodiments use an encoding neural network to encode a set of model queries of a training dataset to generate a first vector dataset. Some embodiments may then train a language model using the first vector dataset. By converting text-based queries into a vector form, some embodiments may condense a training set and reduce the time needed to train a language model.

When configuring a language model, some embodiments may configure the language model based on a specific schema of a target database. By adapting different schemas to a shared structure, some embodiments may broaden the use case of a query-generating language model. A language model may replace generic names generated by a portion of the language model with specific field names used in a schema used to configure the language model. For example, a query-generating language model may be provided, as a set of configuration values, a schema that includes the values "type book {name: string, author: string}." Some embodiments may generate a query template using a first portion of the configured language model that recites "query GetData {ob1 {string1; string2}}" and use a second portion of the configured language model to update the query template to recite "query GetData {book {name; author}}." Alternatively, or additionally, some embodiments may configure a language model based on a schema by first determining a schema of a target database and training the language model based on a training dataset that includes queries associated with the schema. For example, the queries used in the training set may include queries that retrieve, modify, or delete records storing data structured in the manner defined by the schema.

Some embodiments may generate a set of metadata representing an intent of a query and use the intent to configure one or more parameters of the language model. For example, some embodiments may use a first portion of a language model to first convert an initial query into a set of embedding vectors in an embedding space and determine an intent of the query, such as "modifying," "creating," "searching," etc. Some embodiments may configure a second portion of the language model based on the determined intent and then provide the set of embedding vectors to the configured second portion of the language model.

As described elsewhere in this disclosure, some embodiments may configure a language model by training the language model. When training a language model, some embodiments may use training data based on tokenized sequences indicated to be sequences of correct program code or other types of queries. Some embodiments may also determine an intent associated with a query, where the intent may be selected from a category set. For example, some embodiments may select an intent category having the identifier "modify data," where the first intent category may indicate that a purpose of a query is to modify data. Some embodiments may then provide, in addition to a user-provided query, the intent category to the first language model, where providing a value to a language model may include providing the value to the language model as an input or modifying a configuration of the language model based on the value (e.g., using the value as a hyperparameter).

Some embodiments may modify or update a temperature parameter of a language model when generating a query. A temperature parameter may control the amount of variation in the generated output with respect to an input to the generative language model. While different language models may implement a temperature parameter in different ways, a language model that has a temperature parameter that is set to a zero will provide the same output so long as its input is the same. For example, some embodiments may obtain instructions to set a temperature parameter of a generative language model to zero. Some embodiments may then obtain a first user-provided query "Query: {h(obj, args, context, info) {return context.db.loadHByID(args.id).then (userData=>new H(userData))}}" at a first time and provide the user-provided query to the generative language model, where the generative language model may produce the query output "Query: {hu(obj, args, context, info) {return context.db.getHu (args.id).then(userData=>new Hu(userData))}}." Some embodiments may then obtain the same user-provided query text "Query: {h(obj, args, context, info) {return context.db.loadHByID(args.id).then(userData=> new H(userData))}}" at a later time. In response, the generative language model having a temperature parameter equal to zero will return the same output "Query: {hu(obj, args, context, info) {return context.db.getHu (args.id).then (userData=>new Hu(userData))}}." In contrast, a generative language model having a temperature parameter set to a non-zero value may return a different output.

Some embodiments may configure a second language model based on the schema and a second set of queries representing erroneous queries, as indicated by block 308. In some embodiments, the first language model used to generate queries and a second language model used to detect issues associated with the generated queries may have a similar or the same architecture. For example, the first language model may include a transformer-based ensemble machine learning model, and the second language model may also include a transformer-based ensemble machine learning model. Alternatively, or additionally, the second language model is a different machine learning architecture than the first language model. For example, the first language model may include a transformer-based ensemble machine learning model, while the second language model may include a convolutional neural network without having a transformer-based machine learning model. Furthermore, similar to the training dataset used to train a query-generating language model, some embodiments may encode a set of erroneous model queries into another vector dataset and train an issue-detecting language model using this other vector dataset.

Some embodiments may train the second language model used to detect issues in a query based on a training set storing specific queries or query templates associated with one or more issues. For example, some embodiments may train a second language model based on a training set that includes source code for an erroneous query and an indication of a text portion of the erroneous query directly associated with an error or other issue. Various types of issues may be detected using a trained language model. For example, some training sets may indicate erroneous queries that, if executed, would result in an actual error message. Alternatively, or additionally, some embodiments may point out other types of erroneous issues, such as the use of a deprecated field of a data table, a sub-optimal nesting of sub-queries in a resolver function, a query that would consume more resources than allocated for a query function, a query that attempts to access data that a user of the query should not have access to, etc.

When configuring an issue-detecting language model, some embodiments may configure the language model using the same schema used to configure a query-generating language model. For example, some embodiments may configure a language model by training the language with a set of erroneous model queries and an associated set of indicated portions of the set of erroneous model queries. Furthermore, some embodiments may configure an issue-detecting language model with a schema by providing names or other data of the schema to the issue-detecting language model. A first portion of the configured issue-detecting language model may then rename one or more strings of an input query to a different name and then provide the modified input query to a second portion of the issue-detecting language model. For example, some embodiments may configure an issue-detecting language model with a first schema that includes the phrase "type T1 {title: String; sensor: string}." In some embodiments, after being provided with an input query that recites in part "query GetData {title; sensor}," the configured issue-detecting language model may update the input query to recite "query f_x {string_n1; string_n2}."

Some embodiments may obtain a set of inputs, as indicated by block 312. In some embodiments, a client device may send a set of inputs to a computing system, where the computing system may then perform one or more operations described in this disclosure. For example, a client device may be used by a user to provide a server with a natural language query, such as "find all instances of users having the name "xym" having conducted transactions between January 1 and January 30 this year." Alternatively, or additionally, some embodiments may obtain a query written in a query language as an input. For example, some embodiments may obtain text representing source code for a graphQL query that includes source code for one or more resolver functions.

In some embodiments, the obtained set of inputs may include other information, such as information about the query language or natural language that the query is written in, information about a target database or target schema of the target database, information about a target environment in which the query is to function, information about an application that is to use the query, etc. Furthermore, in some embodiments, the set of inputs may include information about a user, such as user access information that would be used to determine whether a user has permission to access one or more fields of a target database.

Some embodiments may determine a candidate context based on the set of inputs, as indicated by block 320. In some embodiments, the candidate context may represent information that can be used to select or configure a language model. Some embodiments may determine candidate context information indicating a target database, where the target database may reside in or be accessible in a set of computing environments. For example, some embodiments may determine that a set of user inputs includes the database identifier "DB21" and, in response, use "DB21" as candidate context information usable to indicate a first environment in which the database "DB21" is a target environment. Furthermore, some embodiments may determine, as candidate context information, information indicating an initial language (e.g., natural language, programming language, etc.) of a user-provided query. In some embodiments, the candidate context may provide useful information to help with the conversion of user-provided information into a query compatible with a target database. Various types of functions, or subsystems, may be used to determine context information. Some embodiments may use a rule-based system to determine one or more values of a context. For example, some embodiments may use a rule that sets a context value to be equal to a particular target database in response to a determination that a user-provided query includes a data field for the particular target database. Alternatively, or additionally, some embodiments may use a machine learning model to determine one or more context values based on a set of user inputs. For example, some embodiments may provide a query to a machine learning model that outputs the category "graphQL" based on the query, where the category represents a query language or programming language in which the query is written.

Some embodiments may determine whether the candidate context satisfies a set of criteria, as indicated by block 326.

Some embodiments may determine whether a candidate context satisfies a set of criteria based on whether the candidate context matches with a stored context associated with a schema. For example, some embodiments may determine that a schema may be associated with a target database such that a detected match between a candidate context and a stored context associated with the schema indicates that queries written in the candidate context should be written for the target database. For example, some embodiments may determine that a first query written in the GraphQL query language is associated with a first candidate context. Some embodiments may then determine that the candidate context matches with a stored context and that this stored context is associated with a schema for user transactions. Some embodiments may then generate a query based on this detected match, as indicated elsewhere in this disclosure.

In response to a determination that the candidate context matches with a stored context associated with a schema, some embodiments may proceed to operations described by block 340. Alternatively, some embodiments may return to operations of block 326 to determine whether a different stored context matches with the candidate context. Furthermore, some embodiments may determine that no stored contexts match with a candidate context and provide a user with an indication that an attempted match could not be found. Alternatively, or additionally, some embodiments may provide a default output or substitute the candidate context with a default candidate context to force a match with a stored context.

Some embodiments may generate a query based on the set of inputs, as indicated by block 340. For example, some embodiments may obtain a user-provided query (e.g., source code written in a text string), where the user-provided query may be written in GraphQL and may be designed for databases in a development computing environment. Some embodiments may then provide the user-provided query to a first large language model to obtain an output query, where the output query is also written in the GraphQL query language but has been modified with respect to its structure and identify databases to be compatible with a test environment. Alternatively, or additionally, some embodiments may use language models that may convert queries in a first query language to queries in a second query language. For example, some embodiments may obtain a text string representing a first query provided by a user that is written in the GraphQL query language. Some embodiments may then provide a first text string representing the first query to a large language model trained using operations described in this disclosure, where the trained large language model may output a second text string representing a query in the SQL query language.

Furthermore, some embodiments may detect that an input query is a prototype query written in a natural language form or other non-programming-language form. In response, some embodiments may associate the input query with an initial query status indicator that indicates that the input query is provided in natural language form or other non-programming-language form. Some embodiments may then select a language model based on the initial query status indicator. For example, some embodiments may detect that an initial query status indicator is set to the value "natural language" and, in response, select a language model adapted to convert natural language statements into programmatic queries written in a query language. Alternatively, some embodiments may configure a language model based on the initial query status indicator. For example, some embodiments may detect that initial query status indicator set to the value "natural language" and, in response, update a language model parameter of a natural language model equal to "1" instead of "0."

Some embodiments may use a wrapper architecture (e.g., a LangChain framework) to generate a modified input for a language model and provide the modified input to a language model. For example, some embodiments may use a prompt preprocessor associated with a first language model used to generate queries. The prompt preprocessor may perform operations such as performing preprocessing operations, where the preprocessing operations may include stemming, lemmatizing, or tokenizing a model. Some embodiments may provide a preprocessed input, such as a preprocessed sequence of tokens, as an input to a language model. For example, after preprocessing a query, some embodiments may provide the preprocessed query to an API of a language model. The language model may then return a model-generated output. In some embodiments, the model-generated output may be used directly as an output query. Alternatively, some embodiments may update a model-generated output query with other information, such as substituting a term used in the generated query with a different term compatible with a testing environment. Furthermore, some embodiments may modify a generated query to include one or more data fields of the schema of a target database. For example, some embodiments may generate a portion of a query template that recites "{FIELD1: value}" and replace the dummy data field "FIELD1" of the generated query template portion with a data field "schema_field_1" of a schema of a target database such that the modified query portion recites "{schema_field_1: value}."

As described elsewhere in this disclosure, some embodiments determine an intent associated with a query. Some embodiments may provide the intent to a machine learning model to generate a query, where the different intent may cause the language model to generate different queries even if a same input query is provided to the language model. Alternatively, or additionally, some embodiments may select one of a plurality of language models to generate a query, where the selection is based on the intent. For example, in response to a determination that an intent associated with a first query has a category of "retrieve data," some embodiments may select a first language model from a set of five language models based on an association between the category and the first language model.

Some embodiments may use a temperature parameter to configure a language model, where the temperature parameter may control a degree of randomness in the output of the language model. In some embodiments, the temperature parameter may be set to a pre-defined value, such as zero. Alternatively, some embodiments may permit a user to configure the temperature parameter. For example, some embodiments may obtain a non-zero temperature parameter from a client computing device, and in response to obtaining the temperature parameter, some embodiments may configure the temperature parameter of a query-generating language model, such that the query-generating language model will generate different queries, even if provided with the same input.

Some embodiments may use a query-generating language model to generate a query that is written in a first query language or programming language into a query written in a second query language or programming language. Alternatively, or additionally, some embodiments may generate queries that are written in a same query language as an input query language provided to the query-generating language model, where a candidate query may be adapted to a different environment. For example, some embodiments use query language configured to convert a first query that was written in a development environment into a second query that is to be used in a testing environment. In many cases, the environments between a first environment and a second environment may differ with respect to the database being used, the name of the databases being used, the fields of the database being used, the APIs being used, etc. Some embodiments may retrieve a set of mapping information between a data field of a database in a first environment and a data field of a second database in a second environment. The set of mapping information may indicate that conversions of functions, scripts, or other collections of operations from the first environment to the second environment should include conversions of the data field. For example, some embodiments may retrieve the set of mapping information that indicates that the data field "f1" of a database "db1" of a first environment maps to a data field "f2" of a database "db2" of a second environment. Some embodiments may then first generate a query that includes a function referring to the data field "f1" and the database "db1." Some embodiments may then replace the previous values of this generated query with the new data field and database names found in the set of mapping information such that the updated generated function refers to the data field "f2" and the database "db2."

When generating a new query from an input query or other set of inputs, some embodiments may use new functions or operators that were not used in the input query or other set of inputs. For example, some embodiments may obtain a user-provided input query written in GraphQL that does not include a lookahead function, where a lookahead function may be a function that causes a computing device executing a query to look ahead in a query to get appropriate sub-fields of a data field being retrieved. The use of a lookahead function may reduce the total amount of computing resources and network resources being used to retrieve data from a database. Some embodiments may provide the user-provided input query lacking the lookahead function to a query-generating language model. The query-generating language model may then generate a response that includes a lookahead function. For example, some embodiments may receive, as an input query, a GraphQL resolver function to retrieve a first field "F1," where "F1" has sub-fields "SF1," "SF2," and "SF3" (e.g., "F1(id: "f") {SF1; SF2; SF3}" in some query languages). Some embodiments may use a trained query-generating model to generate a function that includes a set of lookahead functions to perform operations such as determining the sub-fields "SF1," "SF2," and "SF3" or determining backend fields from sub-fields and a dependency map.

Some embodiments may provide the generated query to a second language model to identify an indicated portion of the generated query, as indicated by block 344. Some embodiments may provide the generated query as an input to an issue-detecting language model, such as the second language model described for block 308. As described elsewhere in this disclosure, an issue-detecting language model may detect one or more issues of a query that may cause a query to fail, work inefficiently, or be otherwise sub-optimal for a purpose of the query.

As described elsewhere in this disclosure, some embodiments may implement a query as a function. For example, some embodiments may generate program code for a GraphQL resolver or other type of query language function. Some embodiments may invoke a generated function to retrieve data from a target database using the generated function. For example, after generating a GraphQL resolver, some embodiments may invoke the GraphQL resolver to retrieve data from a target database. As described elsewhere in this disclosure, some embodiments may use the results of invoking a generated function to train a language model to improve code generation or to train a language model to better detect possible issues based on error messages that are produced in response to the invocation.

In some embodiments, an issue may be associated with a specified category. For example, each issue detected by an issue-detecting language model may be associated with one of a set of categories that includes a first category label "fatal," a second category label "test environment only," and a third category label "possibly inefficient." In some embodiments, two or more categories of a set of categories may be mutually exclusive, and other categories may be shared. Furthermore, some embodiments may use categories to determine whether a generated query is to be presented to a user. For example, some embodiments may determine that a first query having an issue associated with the category label "fatal" does not satisfy a criterion that no queries labeled as "fatal" be provided to a user and, in response, cause an additional use of a query-generating language model to generate a second query.

Some embodiments use a trained language model to detect possible errors or other issues based on authentication or authorization status. For example, some embodiments may store, access, or use an error-detecting language model that will take, as an input, a user status. In some embodiments, a user authorization status may be required to determine whether or not a query will be successful. For example, a dataset may be locked such that only users having a certain authorization status are permitted to access data in this locked dataset. Some embodiments may obtain, in addition to a generated query, a user authorization status indicating that a user has third-party customer access to data in an environment. Some embodiments may then predict, with a trained language model, whether one or more errors or other issues will be indicated based on the user authorization status.

Some embodiments may generate an issue indicator based on the indicated portion of the generated query, as indicated by block 350. In some embodiments, an issue indicator may include the indicated portion itself. For example, some embodiments may determine that the phrase "Select * in DB1" is associated with a detected issue and, in response, store the phrase "Select * in DB1" as an issue indicator. Alternatively, or additionally, some embodiments may store a set of values indicating the positions in text representing the foundries of an issue. For example, some embodiments may store, as an issue indicator, the array "[52, 991]" to indicate that text between the positions "52" and "991" is associated with an issue.

Some embodiments may generate data that causes a client device to visually present the issue indicator concurrently with the generated query, as indicated by block 354. Some embodiments may prepare data for transmission to a client device, where the client device may display a representation of an identified portion associated with an issue concurrently with a representation of an issue indicator. For example, some embodiments may provide listed data to a client device, where a first portion of the listed data includes source code of a resolver function, where a second portion of the listed data includes a set of numbers representing positions in the source code associated with an issue, and where a third portion of the listed data includes a category value representing the type of issue that has been identified by the issue indicator. Some embodiments may then send the prepared data to a client device, such as a mobile computing device or a laptop. The client device may then display the source code and highlight the portion of the source code defined by the set of numbers representing positions in the source code text. Furthermore, the client device may display a name representing the type of issue in response to a detected interaction with the highlighted portion of source code (e.g, hovering a mouse cursor over the highlighted portion, clicking on the highlighted portion, tapping on the highlighted portion, etc.).

In some embodiments, a historical set of templates may be displayed in association with a highlighted portion of the query or issue presenting the highlighted portion of the query. For example, some embodiments may detect an issue using an issue-detecting language model. After determining the issue and identifying the issue with an issue indicator, some embodiments may determine that the issue is associated with a first query template, and the query template may represent a portion of source code that mitigates the identified issue. For example, some embodiments may determine that an indicated portion of a generated query refers to a database that is deprecated and, in response, provide a set of identifiers of query templates indicating a current version of the database to a client device. The client device may then use the set of identifiers of the query templates to retrieve text source code of the query templates and present the text source code of the query templates. Some embodiments may then store the set of identifiers of query templates in association with the indicated portion in server-side memory for faster data retrieval when receiving a similar query. In some embodiments, these templates may be sent from a server or other computing device to a client device. Alternatively, some embodiments may send identifiers of the templates such that a client device may use the sent identifiers to determine which client-stored query templates to display in association with a representation of an issue indicator.

As described elsewhere in this disclosure, a language model may be configured with a zero-value temperature parameter or a temperature parameter that is set to a non-zero value. Some embodiments may take advantage of a non-zero temperature parameter by repeatedly generating different queries based on a shared input query. For example, some embodiments may provide a GraphQL query to a language model having a non-zero temperature parameter that is configured to generate 10 different candidate queries, where the differences between the 10 different candidate queries may be based in part on the temperature parameter. Some embodiments may then provide each of the different candidate queries to an issue-detecting language model to determine candidate sets of issue indicators associated with each of the different candidate queries, where each issue indicator of the sets of issue indicators is associated with an issue category (e.g., "fatal," "possibly inefficient," etc.). For example, a first candidate indicator set for a first candidate query may include three issue indicators associated with the issue category "possibly inefficient," and a second candidate indicator set for a second candidate query may include two issue indicators associated with the issue category "possibly inefficient."

Some embodiments may then select one of the generated candidate queries for use as a query to be sent to the client based on the candidate issue indicator sets or the issue categories associated with issues of the candidate issue indicator sets. For example, some embodiments may determine, for each respective set of issue indicators of each respective query of a set of candidate queries, that the respective set of issue indicators satisfies a set of criteria including a criterion that the respective set of issue indicators is not labeled with the category label "fatal." Some embodiments may apply more sophisticated criteria. For example, some embodiments may determine whether a generated query that is associated with an indicator set satisfies a set of indicator criteria that includes a criterion that the generated query has the minimum number of issues associated with that issue type. For example, some embodiments may generate five different queries and then provide each query of the five different queries to a second language model, such that each respective generated query of the five queries is associated with a respective indicator set. Some embodiments may then determine that, of the five indicator sets, a count of issues associated with the "possibly inefficient" category label for a first indicator set is the minimum count in comparison to other counts of indicators associated with the "possibly inefficient" category label of the other indicator sets. In response, some embodiments may select the query associated with this first indicator set to be sent to a client's device or visualized in a client device UI. Alternatively, some embodiments may select a particular candidate query for use based on the number of issues that are detected. For example, some embodiments may select a first candidate query based on a determination that a candidate indicator set associated with the first candidate query has a minimum number of total indicators relative to the count of total indicators of other candidate indicator sets.

After generating an issue indicator, some embodiments may store the issue indicator in association with the generated query in one or more non-transitory, machine-readable media. For example, some embodiments may update a database to include a record, where the record includes both a generated query and data of an issue indicator (e.g., an issue name, an issue type, the portion of a generated query identified by the issue indicator, etc.). In some embodiments, the one or more non-transitory, machine-readable media used to store the issue indicator data may be the same as the one or more non-transitory, machine-readable media storing program instructions that, when executed by a set of processors, cause the set of processors to perform one or more operations described in this disclosure. Alternatively, or additionally, some embodiments may store the issue indicator (or other data generated using operations described in this disclosure) in a different set of non-transitory, machine-readable media.

Some embodiments may invoke the generated query, as indicated by block 358. For example, some embodiments may provide a generated query to a client computing device and, in response, receive from the client computer device instructions to invoke the generated query. Alternatively, some embodiments may directly invoke a generated query without waiting for user-provided instructions. For example, after providing a user-provided query to a query-generating language model, some embodiments may obtain a generated query from the query-generating language model. Some embodiments may then invoke the generated query to retrieve, modify, delete, or otherwise update a dataset based on the generated query.

Some embodiments may increase a weight for future training after receiving a user-provided signal that a generated function performed properly after invocation. For example, after receiving instructions from a user, some embodiments may invoke a generated query function to retrieve information based on the function from a target database. Some embodiments may then provide the retrieved data to the user and obtain a satisfaction indicator that the user is satisfied with the information retrieved with the generated query. Some embodiments may use the satisfaction indicator to update a set of training datasets to indicate that a generated output is successful, where some embodiments may then retrain a query-generating language model based on the updated set of training data. This retraining operation may modify the query-generating language model such that the query-generated language model is more likely to generate a new query that would be indicated as satisfactory by the user. For example, some embodiments may update a set of training data with the user-provided query "queryqueryquery" based on a user-provided indication that "queryqueryquery" is a satisfactory query. Some embodiments may then retrain a query-generating language model based on the updated the set of training data. After this retraining operation, the query-generating language is more likely generate "queryqueryquery." In some embodiments, the set of training data may be updated such that a weight associated with the generated query is increased to reflect that the generated query satisfies the user.

Some embodiments may encounter non-predicted error messages when retrieving data using a machine-generated query. For example, some embodiments may use the machine-generated query that is intended to retrieve a dataset from a first database but, instead of receiving the target dataset, receive a set of error messages indicating that the target dataset does not exist. In response, some embodiments may update a training dataset used to train an issue-detecting language model based on the set of error messages.

Some embodiments may display a set of compatible environments associated with a generated query. Some embodiments may determine the set of compatible computing environments by filtering out non-compliant environments based on which set of databases or set of data fields is being used, such that a non-compliant environment is one in which this set of databases or set of data fields is not used in the non-compliant environment. Some embodiments may then cause a display device to display identifiers of the set of compatible environments. For example, some embodiments may determine that the set of compatible environments for a query includes "DEVELOPMENT SERVER 1" and "TEST SERVER 2" based on a determination that a set of data fields used in the query is compatible with "DEVELOPMENT SERVER 1" and "TEST SERVER 2." Some embodiments may then generate or update data to include a set of identifiers of this set of compatible environments, where this data is sent to the client computing device, such that the client computing device displays "DEVELOPMENT SERVER 1" and "TEST SERVER 2."

Some embodiments may generate an updated query based on the issue indicator, as indicated by block 364. Some embodiments may use the query-generating language model or another language model to generate an updated query based on a first generated query and an issue indicator. For example, some embodiments may determine that a source code for a resolver includes a set of nested commands and that a portion of the set of nested commands has been flagged by an issue-detecting language model as being associated with an issue indicator. Some embodiments may then provide the set of nested commands and the issue indicator of the portion to the first language model to generate an updated language model, where the updated language model may have a different structure such that an inner portion and outer portion of the nested commands are flattened. In many cases, flattening a nested structure of a query may increase the efficiency of the query while still accessing the data fields identified by inner and outer portions of the nested structure.

Some embodiments may obtain additional inputs associated with a generated query from a user and use these additional inputs in a reinforcement learning architecture. For example, some embodiments may provide a first query to a client computing device and, in response, obtain a second query from the client computing device. Some embodiments may then determine a set of differences between the first query provided to the client computing device and the second query obtained from computing device. The set of differences may include a difference in text (e.g., the addition, modification, or removal of words, phrases, characters, symbols, etc.). Alternatively, or additionally, the set of differences may include vector differences between a set of vectors derived from the first query and a second set of vectors derived from the second query. Furthermore, some embodiments may use a second query that is provided by a client device after sending a first query to the client device to update a language model used to generate the first query. For example, some embodiments may add the second query to a training dataset used to train a query-generating language model, where the second query may be associated with the first query. Alternatively, or additionally, some embodiments may generate a record associating the second query with an initial query used as an input to the query-generating language model to generate the first query and use this record to train or otherwise update the query-generating language model.

Some embodiments may implement the use of a set of difference criteria to reduce the number of superfluous updates to a language model. For example, some embodiments may implement a set of difference criteria that includes a first criterion that the difference between a generated query and a user-provided query includes at least one different character (as opposed to blank spaces) and a second criterion that the difference between the generated query and the user-provided query includes at least one change in a nesting structure of the two different queries. In response to a determination that the two criteria are satisfied, some embodiments may update a language model by training the language model with a training dataset that includes the user-provided query.

The operations of each method presented in this disclosure are intended to be illustrative and non-limiting. It is contemplated that the operations or descriptions of FIG. 3-4 may be used with any other embodiment of this disclosure. In addition, the operations and descriptions described in relation to FIG. 3-4 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated is not intended to be limiting. In some embodiments, a client device may directly perform one or more operations described in this disclosure as being performed by a server or other computing system. For example, with reference to blocks 304 or 308, a client device may train or otherwise configure a language model to generate a query or detect issues with a query.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods. For example, it should be noted that one or more of the devices or equipment discussed in relation to FIG. 1 could be used to perform one or more of the operations described for descriptions corresponding to FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems 121-125 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some or all of the functionality attributed herein to one of the subsystems 121-125 described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating the record or modifying the value of an already-generated value of the record.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

The present techniques will be better understood with reference to the following enumerated embodiments:

A.1. A method comprising: selecting a first context based on a set of inputs comprising a first query obtained from a client device; determining a match between the first context and a stored context associated with a schema; in response to the determination of the match, generating a second query based on the set of inputs with a first language model; identifying an indicated portion of the second query by providing, as a second input, the second query to a second language model; generating data comprising an issue indicator of the second query based on the indicated portion; and sending the data to the client device.

A.2. The method of embodiment A.1, wherein the first language model is configured with a schema of a target database and a first set of queries.

A.3. The method of embodiment A.2, wherein the second language model is configured with the schema and a second set of queries.

A.4. The method of embodiment A.3, wherein the data causes the client device to visually present a representation of the indicated portion concurrently with a representation of the issue indicator.

A.5. A method comprising: obtaining, from a client device, a set of user-provided inputs comprising a user-generated query written in a first query language; determining a candidate context used to identify databases based on the set of user-provided inputs; determining a match between the candidate context and a stored context associated with a schema; in response to the match between the candidate context and the stored context associated with the schema, generating, with a query-generating language model, a second query based on the set of user-provided inputs, wherein the query-generating language model is configured with a schema for data in a target database and a set of model queries; identifying an indicated portion of the second query by providing, as a second input, the second query to an error-detecting language model, wherein the error-detecting language model is configured with the schema and a set of erroneous model queries associated with error indicators; generating data comprising an issue indicator of the second query based on the indicated portion of the second query to identify the indicated portion; and sending the data to the client device, wherein the data causes the client device to visually present a representation of the indicated portion concurrently with a representation of the issue indicator.

A.6. A method comprising: obtaining, from a client device, a set of inputs comprising a first query; determining a candidate context based on a set of inputs; determining a match between the candidate context and a stored context associated with a schema; in response to a determination of the match between the candidate context and the stored context associated with the schema, generating a second query based on the set of inputs with a first language model, wherein the first language model is configured with a schema of a target database and a first set of queries; identifying an indicated portion of the second query by providing, as a second input, the second query to a second language model, wherein the second language model is configured with the schema and a second set of queries associated with error indicators; generating data comprising an issue indicator of the second query based on the indicated portion; and sending the data to the client device, wherein the data causes the client device to visually present a representation of the indicated portion concurrently with a representation of the issue indicator.

A.7. The method of any of embodiments A.1 to A.6, wherein the representation of the issue indicator comprises a highlighted region around the indicated portion or a border around the indicated portion.

A.8. The method of any of embodiments A.1 to A.7, wherein: identifying the indicated portion of the second query comprises obtaining a set of identifiers of query templates associated with the indicated portion; and generating the data comprises: retrieving the query templates from a database based on the set of identifiers; and generating the data based on the query templates.

A.9. The method of any of embodiments A.1 to A.8, wherein generating the second query comprises: generating, with a prompt preprocessor of the first language model, a preprocessed sequence based on the set of inputs and the schema associated with the candidate context; and providing the preprocessed sequence to an application programming interface (API) of the first language model to obtain a model-generated output; and determining the second query based on the model-generated output.

A.10. The method of embodiment A.9, wherein determining the second query comprises modifying the model-generated output to comprise a field of the schema.

A.11. The method of any of embodiments A.1 to A.10, wherein a temperature parameter of the first language model is set to zero.

A.12. The method of any of embodiments A.1 to A.11, wherein determining the candidate context comprises providing a text string of the set of inputs to the first language model to predict the candidate context.

A.13. The method of any of embodiments A.1 to A.12, further comprising: providing the second query to a client computing device; obtaining a third query from the client computing device; determining a difference between the third query and the second query; determining a result indicating that the difference satisfies a set of difference criteria; and in response to the result, updating the first language model based on the second query.

A.14. The method of any of embodiments A.1 to A.13, wherein the indicated portion comprises a data field, further comprising: generating a query portion comprising a lookahead function based on the data field; and associating the query portion with the indicated portion.

A.15. The method of any of embodiments A.1 to A.14, the method further comprising storing, in at least the one or more non-transitory media or a different set of non-transitory media, the second query in association with the issue indicator.

A.16. The method of any of embodiments A.1 to A.15, the method further comprising: obtaining a third query from the client device; determining a difference between the second query and the third query; determining a result indicating that the difference satisfies a set of difference criteria; and in response to the result indicating that the difference satisfies the set of difference criteria, updating the first language model based on the third query.

A.17. The method of any of embodiments A.1 to A.16, wherein: a temperature parameter of the first language model is non-zero; and generating the second query comprises generating a plurality of candidate queries comprising the second query using the first language model configured with the temperature parameter, wherein: generating the data comprises generating the data to comprise the plurality of candidate queries; and the data causes the client device to visually present the second query concurrently with a third query of the plurality of candidate queries.

A.18. The method of embodiment A.17, wherein: providing the first query to the second language model comprises providing the plurality of candidate queries to the second language model to obtain a plurality of indicator sets, wherein a candidate indicator set of the plurality of indicator sets is generated based on the second query, and wherein the candidate indicator set comprises the issue indicator; determining whether the candidate indicator set satisfies a set of indicator criteria; and updating the data to indicate the second query based on a determination that the candidate indicator set satisfies the set of indicator criteria, wherein the data causes the client device to highlight or outline at least a portion of the second query.

A.19. The method of any of embodiments A. 17 to A.18, wherein determining whether the candidate indicator set satisfies the set of indicator criteria comprises determining whether a count of total indicators of the candidate indicator set is a minimum in comparison to other counts of total indicators of indicator sets of the plurality of indicator sets.

A.20. The method of any of embodiments A.1 to A.19, the method further comprising determining a set of compatible environments based on a set of data fields of the second query, wherein the data causes the client device to present identifiers of the set of compatible environments.

A.21. The method of any of embodiments A.1 to A.20, wherein generating the second query comprises generating a function in a query language, the method further comprising: obtaining an indication that the function has been invoked to retrieve information from the target database; obtaining a satisfaction indicator indicating that the issue indicator is inaccurate; updating a set of training data based on the satisfaction indicator; and retraining the second language model based on the set of training data.

A.22. The method of any of embodiments A.1 to A.21, wherein: providing the second query to the second language model comprises generating a plurality of candidate indicators comprising the issue indicator; each indicator of the plurality of candidate indicators is associated with a category of a plurality of categories; and the data causes the client device to display indicators associated with a first category of the plurality of categories.

A.23. The method of any of embodiments A.1 to A.22, the method further comprising: determining a user authorization status; and determining whether the user authorization status permits access to a set of data fields of the second query, wherein generating the data comprises generating the data in response to a determination that the user authorization status permits access to the set of data fields of the second query.

A.24 One or more tangible, non-transitory, machine-readable media storing instructions that, when executed by a set of processors, cause the set of processors to effectuate operations comprising those of any of embodiments A.1 to A.23.

A.25 A system comprising: a set of processors and a set of media storing computer program instructions that, when executed by the set of processors, cause the set of processors to effectuate operations comprising those of any of embodiments A.1 to A.23.

B.1. A method comprising: configuring a first language model with a schema of a target database and a first set of queries; configuring a second language model with the schema and a second set of queries; selecting a first context based on a set of inputs; determining a match between the first context and a stored context associated with the schema; in response to a determination of the match between the first context and the stored context associated with the schema, generating a query based on the set of inputs with the first language model; associating an issue indicator with an indicated portion of the query by providing, as a second input, the query to the second language model; and storing, in one or more non-transitory media, the query in association with the issue indicator.

B.2. A method comprising: configuring a query-generating first language model with a schema for data in a target database and a set of model queries; configuring an error-detecting second language model with the schema and a set of erroneous model queries; determining a candidate context used to identify databases based on a set of user-provided inputs; determining a match between the candidate context and a stored context associated with the schema; in response to a determination of the match between the candidate context and the stored context associated with the schema, generating, with the query-generating first language model, an initial query based on the set of user-provided inputs; identifying an indicated portion of the initial query by providing, as a second input, the initial query to the error-detecting second language model; generating an issue indicator of the initial query based on the indicated portion of the initial query to identify the indicated portion; and generating an updated query based on the issue indicator.

B.3. A method comprising: configuring a first language model with a schema of a target database and a first set of queries; configuring a second language model with the schema and a second set of queries; determining a candidate context based on a set of inputs; determining a match between the candidate context and a stored context associated with the schema; in response to a determination of the match between the candidate context and the stored context associated with the schema, generating a query based on the set of inputs with the first language model; identifying an indicated portion of the query by providing, as a second input, the query to the second language model; generating an issue indicator of the query based on the indicated portion; and storing, in one or more non-transitory media, the query in association with the issue indicator.

B.4. The method of any of embodiments B.1 to B.3, wherein generating the query comprises generating a function in a query language, the method further comprising invoking the function to retrieve information from the target database.

B.5. The method of any of embodiments B.1 to B.4, further comprising: identifying the indicated portion of the query comprises obtaining a set of identifiers of query templates associated with the indicated portion; and storing the set of identifiers of query templates in association with the issue indicator or the query.

B.6. The method of any of embodiments B.1 to B.5, wherein generating the query comprises: generating, with a prompt preprocessor of the first language model, a preprocessed sequence based on the set of inputs and the schema associated with the candidate context; and providing the preprocessed sequence to a language model application programming interface (API) of the first language model to obtain a model-generated output; and determining the query based on the model-generated output.

B.7. The method of embodiment B.6, wherein determining the query comprises modifying the model-generated output to comprise a field of the schema.

B.8. The method of any of embodiments B.1 to B.7, further comprising: selecting an intent of a category of intents based on the set of inputs; and generating the query comprises providing the intent to the first language model.

B.9. The method of any of embodiments B.1 to B.8, wherein a temperature parameter of the first language model is set to zero.

B.10. The method of any of embodiments B.1 to B.9, wherein determining the candidate context comprises providing a text string of the set of inputs to the first language model to predict the candidate context.

B.11. The method of any of embodiments B.1 to B.10, wherein the query is a first query, further comprising: providing the first query to a client computing device; obtaining a second query from the client computing device; determining a difference between the first query and the second query; and in response to a determination that the difference satisfies a set of difference criteria, updating the first language model based on the second query.

B.12. The method of any of embodiments B.1 to B.11, further comprising: obtaining a temperature parameter value from a client device; and updating a temperature parameter of the first language model based on the temperature parameter value.

B.13. The method of any of embodiments B.1 to B.12, further comprising: detecting, via the second language model, a nested structure of the query, wherein an outer portion of the nested structure indicates a first data field, and wherein an inner portion of the query indicates a second data field; and generating a data structure indicating the first data field and the second data field based on the nested structure.

B.14. The method of any of embodiments B.1 to B.13, wherein: the query is a first query; a temperature parameter of the first language model is non-zero; generating the first query comprises generating a plurality of candidate queries comprising the first query; associating the issue indicator with the indicated portion of the query comprises: providing the plurality of candidate queries to the second language model to obtain a plurality of indicator sets, wherein a first indicator set of the plurality of indicator sets is generated based on the first query, and wherein the first indicator set comprises the issue indicator; determining whether the first indicator set satisfies a set of indicator criteria; and selecting the first query based on a determination that the first indicator set satisfies the set of indicator criteria.

B.15. The method of embodiment B.14, wherein: each respective indicator of the plurality of indicator sets is associated a respective category of a set of categories; the set of categories comprises a first category and a second category; determining whether the first indicator set satisfies the set of indicator criteria comprises determining whether a count of indicators of the first category of the first indicator set is a minimum in comparison to other counts of indicators of the first category of indicator sets of the plurality of indicator sets.

B.16. The method of any of embodiments B.1 to B.15, further comprising determining whether the set of inputs comprises a first data field labeled with a first category indicating a testing environment, wherein generating the query based on the set of inputs with the first language model comprises: retrieving a set of mapping information that associates the first data field with a second data field; and in response to a determination that the set of inputs comprises the first data field, updating the query based on the second data field.

B.17. The method of embodiment B.16, the method further comprising configuring a parameter of the first language model based on an initial query status indicator in response to the determination that the set of inputs comprises the first data field.

B.18. The method of any of embodiments B.1 to B.17, wherein generating the query comprises generating a function in a query language, the method further comprising: invoking the function to retrieve information from the target database; obtaining a satisfaction indicator indicating that the information satisfies a set of criteria; updating a set of training data based on the satisfaction indicator; and retraining the second language model based on the set of training data.

B.19. The method of any of embodiments B.1 to B.18, wherein generating the query comprises generating a function in a query language the method further comprising: invoking the function to retrieve information from the target database; obtaining a set of error messages provided in response to invoking the function; updating a training set based on the set of error messages; and updating the second language model based on the query and the set of error messages.

B.20. The method of any of embodiments B.1 to B.19, wherein providing the query to the second language model comprises: determining a user authorization status; and providing, as inputs, the query and the user authorization status to the second language model.

B.21 One or more tangible, non-transitory, machine-readable media storing instructions that, when executed by a set of processors, cause the set of processors to effectuate operations comprising those of any of embodiments B.1 to B.20.

B.22 A system comprising: a set of processors and a set of media storing computer program instructions that, when executed by the set of processors, cause the set of processors to effectuate operations comprising those of any of embodiments B.1 to B.20.

What is claimed is:

1. A system for generating a query adapted to a custom schema for database-stored data, the system comprising one or more processors and one or more media, the one or more media storing program instructions that, when executed by the one or more processors, cause the one or more processors to perform operations comprising:
    configuring a query-generating first language model with a schema for data in a target database and a set of model queries;
    configuring an error-detecting second language model with the schema and a set of erroneous model queries;
    determining a candidate context used to identify databases based on a set of user-provided inputs;
    determining a match between the candidate context and a stored context associated with the schema;
    in response to a determination of the match between the candidate context and the stored context associated with the schema, generating, with the query-generating first language model, an initial query based on the set of user-provided inputs, wherein generating the initial query comprises generating a candidate query;
    identifying an indicated portion of the initial query by providing, as a second input, the initial query to the error-detecting second language model;
    generating an issue indicator of the initial query based on the indicated portion of the initial query to identify the indicated portion, wherein generating the issue indicator comprises:
        providing the candidate query to the error-detecting second language model to obtain an indicator set, wherein the indicator set is generated based on the candidate query, and wherein the indicator set comprises the issue indicator;
        determining whether the indicator set satisfies a set of indicator criteria; and
        selecting the candidate query as the initial query based on a determination that the first indicator set satisfies the set of indicator criteria; and
    generating an updated query based on the issue indicator.

2. A method comprising:
    configuring a first language model with a schema of a target database and a first set of queries;
    configuring a second language model with the schema and a second set of queries;
    determining a candidate context based on a set of inputs;
    determining a match between the candidate context and a stored context associated with the schema;
    in response to a determination of the match between the candidate context and the stored context associated with the schema, generating a query based on the set of inputs with the first language model, wherein generating the query comprises generating a candidate query;
    identifying an indicated portion of the query by providing, as a second input, the query to the second language model;
    generating an issue indicator of the query based on the indicated portion, wherein generating the issue indicator comprises:
        providing the candidate query to the second language model to obtain an indicator set, wherein the indicator set is generated based on the candidate query, and wherein the indicator set comprises the issue indicator;
        determining whether the indicator set satisfies a set of indicator criteria; and
        selecting the candidate query as the query based on a determination that the indicator set satisfies the set of indicator criteria; and
    storing, in one or more non-transitory media, the query in association with the issue indicator.

3. The method of claim 2, wherein generating the query comprises generating a function in a query language, the method further comprising invoking the function to retrieve information from the target database.

4. The method of claim 2, further comprising:
    identifying the indicated portion of the query comprises obtaining a set of identifiers of query templates associated with the indicated portion; and
    storing the set of identifiers of query templates in association with the issue indicator or the query.

5. The method of claim 2, wherein generating the query comprises:
    generating, with a prompt preprocessor of the first language model, a preprocessed sequence based on the set of inputs and the schema associated with the candidate context; and
    providing the preprocessed sequence to a language model application programming interface (API) of the first language model to obtain a model-generated output; and
    determining the query based on the model-generated output.

6. The method of claim 5, wherein determining the query comprises modifying the model-generated output to comprise a field of the schema.

7. The method of claim 2, further comprising:
    selecting an intent of a category of intents based on the set of inputs; and
    generating the query comprises providing the intent to the first language model.

8. The method of claim 2, wherein a temperature parameter of the first language model is set to zero.

9. The method of claim 2, wherein determining the candidate context comprises providing a text string of the set of inputs to the first language model to predict the candidate context.

10. The method of claim 2, wherein the query is a first query, further comprising:
    providing the first query to a client computing device;
    obtaining a second query from the client computing device;
    determining a difference between the first query and the second query; and
    in response to a determination that the difference satisfies a set of difference criteria, updating the first language model based on the second query.

11. One or more non-transitory, machine-readable media storing program instructions that, when executed by one or more processors, cause the one or more processors to perform operations comprising:

configuring a first language model with a schema of a target database and a first set of queries;

configuring a second language model with the schema and a second set of queries;

selecting a first context based on a set of inputs;

determining a match between the first context and a stored context associated with the schema;

in response to a determination of the match between the first context and the stored context associated with the schema, generating a query based on the set of inputs with the first language model, wherein generating the query comprises generating a candidate query;

associating an issue indicator with an indicated portion of the query by providing, as a second input, the query to the second language model, wherein associating the issue indicator with the indicated portion of the query comprises:

providing the candidate query to the second language model to obtain an indicator set, wherein the indicator set is generated based on the candidate query, and wherein the indicator set comprises the issue indicator;

determining whether the indicator set satisfies a set of indicator criteria; and selecting the candidate query as the query based on a determination that the indicator set satisfies the set of indicator criteria; and storing, in one or more non-transitory media, the query in association with the issue indicator.

12. The one or more non-transitory, machine-readable media of claim 11, the operations further comprising:

obtaining a temperature parameter value from a client device; and updating a temperature parameter of the first language model based on the temperature parameter value.

13. The one or more non-transitory, machine-readable media of claim 11, the operations further comprising:

detecting, via the second language model, a nested structure of the query, wherein an outer portion of the nested structure indicates a first data field, and wherein an inner portion of the query indicates a second data field; and generating a data structure indicating the first data field and the second data field based on the nested structure.

14. The one or more non-transitory, machine-readable media of claim 11, wherein:

the query is a first query;

the indicator set is a first indicator set;

a temperature parameter of the first language model is non-zero;

generating the first query comprises generating a plurality of candidate queries comprising the candidate query; and associating the issue indicator with the indicated portion of the query comprises providing the plurality of candidate queries to the second language model to obtain a plurality of indicator sets comprising the first indicator set.

15. The one or more non-transitory, machine-readable media of claim 14, wherein:

each respective indicator of the plurality of indicator sets is associated a respective category of a set of categories;

the set of categories comprises a first category and a second category;

and determining whether the first indicator set satisfies the set of indicator criteria comprises determining whether a count of indicators of the first category of the first indicator set is a minimum in comparison to other counts of indicators of the first category of indicator sets of the plurality of indicator sets.

16. The one or more non-transitory, machine-readable media of claim 11, the operations further comprising determining whether the set of inputs comprises a first data field labeled with a first category indicating a testing environment, wherein generating the query based on the set of inputs with the first language model comprises:

retrieving a set of mapping information that associates the first data field with a second data field; and in response to a determination that the set of inputs comprises the first data field, updating the query based on the second data field.

17. The one or more non-transitory, machine-readable media of claim 16, the operations further comprising configuring a parameter of the first language model based on an initial query status indicator in response to the determination that the set of inputs comprises the first data field.

18. The one or more non-transitory, machine-readable media of claim 11, wherein generating the query comprises generating a function in a query language, the operations further comprising:

invoking the function to retrieve information from the target database;

obtaining a satisfaction indicator indicating that the information satisfies a set of criteria;

updating a set of training data based on the satisfaction indicator; and retraining the second language model based on the set of training data.

19. The one or more non-transitory, machine-readable media of claim 11, wherein generating the query comprises generating a function in a query language, the operations further comprising:

invoking the function to retrieve information from the target database;

obtaining a set of error messages provided in response to invoking the function;

updating a training set based on the set of error messages; and updating the second language model based on the query and the set of error messages.

20. The one or more non-transitory, machine-readable media of claim 11, wherein providing the query to the second language model comprises:

determining a user authorization status; and providing, as inputs, the query and the user authorization status to the second language model.

* * * * *